(12) United States Patent
Holchin et al.

(10) Patent No.: US 9,151,178 B2
(45) Date of Patent: Oct. 6, 2015

(54) BELLCRANK FOR A VARIABLE VANE ASSEMBLY

(71) Applicant: United Technologies Corporation, Hartford, CT (US)

(72) Inventors: John Holchin, Manchester, CT (US); Mark Boyer, Vernon, CT (US); Tim Harding, Harwinton, CT (US)

(73) Assignee: United Technologies Corporation, Hartford, CT (US)

( * ) Notice: Subject to any disclaimer, the term of this patent is extended or adjusted under 35 U.S.C. 154(b) by 509 days.

(21) Appl. No.: 13/678,433

(22) Filed: Nov. 15, 2012

(65) Prior Publication Data

US 2014/0133968 A1    May 15, 2014

(51) Int. Cl.
   *F01D 9/04*   (2006.01)
   *F01D 17/16*  (2006.01)

(52) U.S. Cl.
   CPC .......... *F01D 17/162* (2013.01); *F05D 2260/50* (2013.01); *Y10T 29/49323* (2015.01); *Y10T 29/49948* (2015.01); *Y10T 29/49959* (2015.01)

(58) Field of Classification Search
   CPC .......... F01D 9/04; F01D 9/041; F01D 17/04; F01D 17/12; F01D 17/162; F05D 2260/50; Y10T 29/49323; Y10T 29/49959; Y10T 29/49948
   See application file for complete search history.

(56) References Cited

U.S. PATENT DOCUMENTS

| | | | | | |
|---|---|---|---|---|---|
| 3,227,176 | A | * | 1/1966 | Luebering et al. | 137/601.08 |
| 3,458,118 | A | * | 7/1969 | Follmer et al. | 415/149.4 |
| 3,779,665 | A | * | 12/1973 | Tatem et al. | 415/123 |
| 3,873,230 | A | * | 3/1975 | Norris et al. | 415/162 |
| 4,275,560 | A | | 6/1981 | Wright et al. | |
| 4,403,912 | A | * | 9/1983 | Pekari et al. | 415/150 |
| 4,619,580 | A | | 10/1986 | Snyder | |
| 4,720,237 | A | | 1/1988 | Weiner et al. | |
| 5,190,439 | A | * | 3/1993 | Das | 415/149.4 |
| 5,549,448 | A | | 8/1996 | Langston | |
| 6,398,483 | B1 | * | 6/2002 | Conete et al. | 415/9 |
| 6,769,868 | B2 | | 8/2004 | Harrold | |
| 6,821,084 | B2 | * | 11/2004 | Bathori et al. | 415/160 |
| 7,322,790 | B2 | * | 1/2008 | Bouru | 415/162 |
| 7,871,242 | B2 | * | 1/2011 | Swanson et al. | 415/145 |
| 8,784,043 | B2 | * | 7/2014 | Bouru | 415/160 |
| 8,915,703 | B2 | * | 12/2014 | Mohammed | 415/160 |

* cited by examiner

*Primary Examiner* — Igor Kershteyn
(74) *Attorney, Agent, or Firm* — Kinney & Lange, P.A.

(57) ABSTRACT

A variable vane assembly for use in a gas turbine engine includes a variable vane, an actuator, and a mechanical linkage. The mechanical linkage connects the variable vane to the actuator. The mechanical linkage includes a bellcrank rotatable about an axis, a first bellcrank arm having a first clevis at an inner end, and a first pin extending through the first clevis and a first flange of the bellcrank to fasten the first bellcrank arm to the bellcrank.

20 Claims, 5 Drawing Sheets

BELLCRANK FOR A VARIABLE VANE ASSEMBLY

BACKGROUND

The present invention relates to gas turbine engines, and in particular, to variable vane assemblies in gas turbine engines.

Gas turbine engines typically include one or more compressor sections, a combustor section, and one or more turbine sections. In some gas turbine engines, variable vanes are included. Such variable vanes can be rotated to different angles suitable for different operating conditions of the gas turbine engine. A mechanical linkage is typically used to rotate the variable vanes. Because forces on the variable vanes can be relatively strong, forces transmitted through the mechanical linkage can also be relatively strong. Operation of the gas turbine engine can cause the mechanical linkage to wear over time, causing degradation in performance and possible failure.

SUMMARY

According to the present invention, a gas turbine engine includes a flow path and a variable vane assembly. The variable vane assembly includes a variable vane positioned in the flow path and rotatable about an axis of the variable vane, an actuator, and a mechanical linkage connecting the variable vane to the actuator. The mechanical linkage includes a bellcrank rotatable about an axis, a first bellcrank arm having a first clevis at an inner end, and a first pin extending through the first clevis and a first flange of the bellcrank to fasten the bellcrank arm to the bellcrank.

Another embodiment is a variable vane assembly for use in a gas turbine engine includes a variable vane, an actuator, and a mechanical linkage. The mechanical linkage connects the variable vane to the actuator. The mechanical linkage includes a bellcrank rotatable about an axis, a first bellcrank arm having a first clevis at an inner end, and a first pin extending through the first clevis and a first flange of the bellcrank to fasten the first bellcrank arm to the bellcrank.

Another embodiment is a method of assembling a variable vane assembly for use in a gas turbine engine. The method includes positioning a flange of a bellcrank in a clevis of a bellcrank arm and inserting a pin through the flange and the clevis to connect the bellcrank arm to the bellcrank.

DETAILED DESCRIPTION

Figure 1:
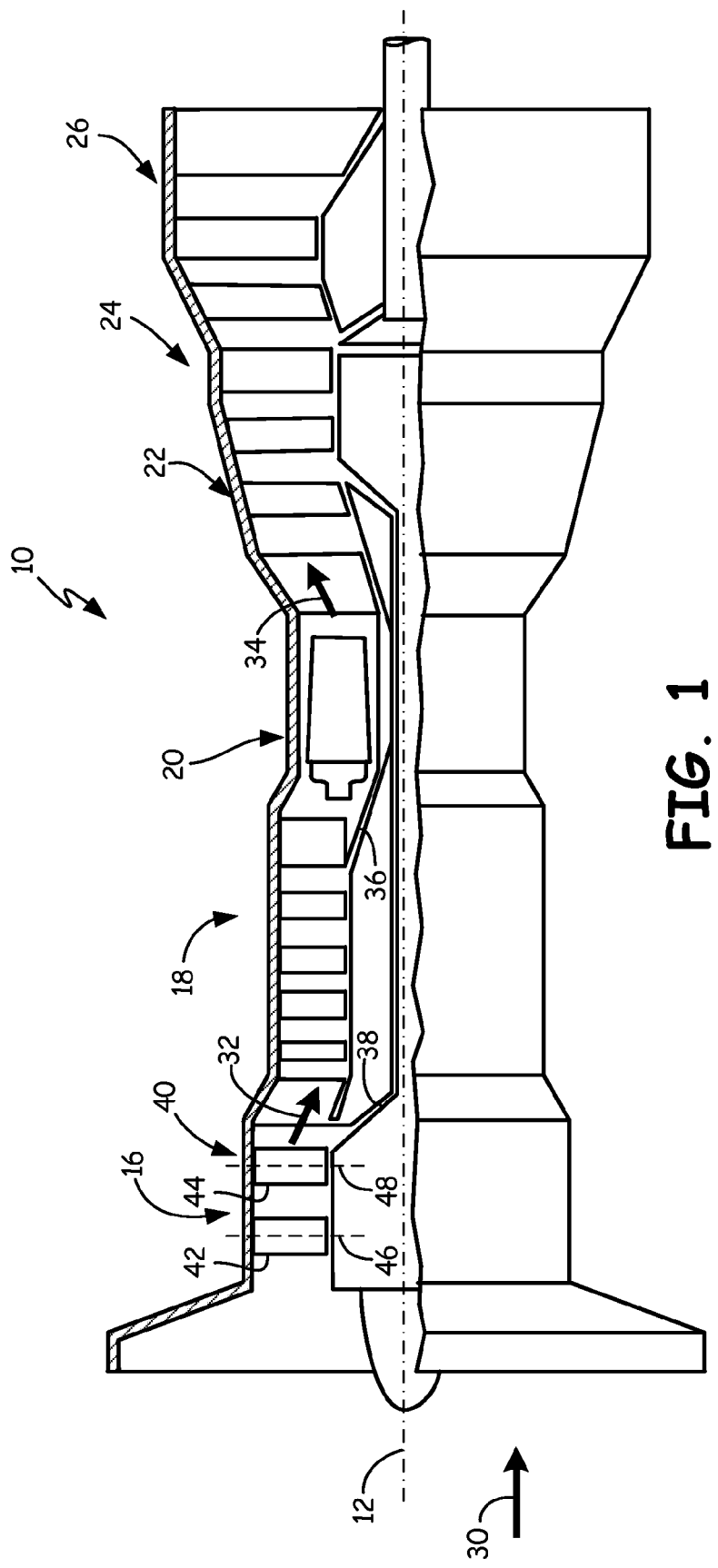
FIG. 1 is a side sectional schematic view of an industrial gas turbine engine.

FIG. 1 is a side partial sectional schematic view of gas turbine engine 10. In the illustrated embodiment, gas turbine engine 10 is an industrial gas turbine engine circumferentially disposed about a central, longitudinal axis or axial engine centerline axis 12 as illustrated in FIG. 1. Gas turbine engine 10 includes in series order from front to rear, low pressure compressor section 16, high pressure compressor section 18, combustor section 20, high pressure turbine section 22, and low pressure turbine section 24. In some embodiments, power turbine section 26 is a free turbine section disposed aft of the low pressure turbine 24.

As is well known in the art of gas turbines, incoming ambient air 30 becomes pressurized air 32 in the low and high pressure compressors 16 and 18. Fuel mixes with pressurized air 32 in combustor section 20, where it is burned. Once burned, combustion gases 34 expand through high and low pressure turbine sections 22, 24 and through power turbine section 26. High and low pressure turbine sections 22 and 24 drive high and low pressure rotor shafts 36 and 38 respectively, which rotate in response to the combustion products and thus rotate the attached high and low pressure compressor sections 18, 16. Power turbine section 26 may, for example, drive an electrical generator, pump, or gearbox (not shown).

Low pressure compressor section 16 includes variable vane assembly 40. In the illustrated embodiment, variable vane assembly 40 includes variable vanes 42 and variable vanes 44. Variable vanes 42 are a first stage of variable vanes rotatable about variable vane axis 46. Variable vanes 44 are a second stage of variable vanes rotatable about variable vane axis 48. Variable vanes 42 and 44 are positioned along a flow path defined by low pressure compressor section 16, with variable vanes 42 positioned upstream of variable vanes 44. Variable vanes 42 and 44 can be rotated to adjust their angle to improve performance of gas turbine engine 10 for different operating conditions.

Figure 2:
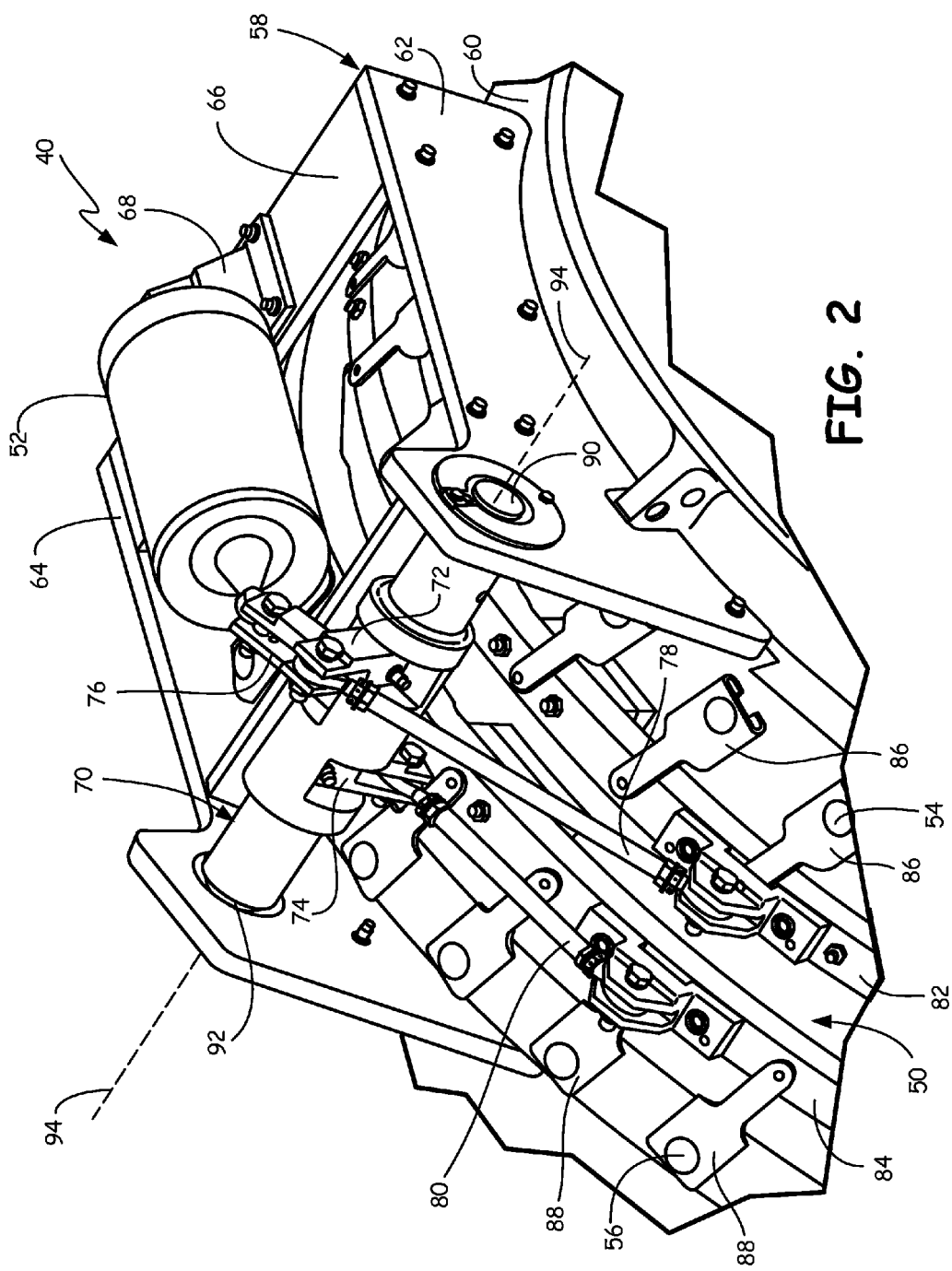
FIG. 2 is a schematic view of a variable vane assembly of the industrial gas turbine engine of FIG. 1.

FIG. 2 is a schematic view of variable vane assembly 40. Variable vane assembly 40 includes mechanical linkage 50 connecting actuator 52 to spindles 54 of variable vanes 42 (shown in FIG. 1) and to spindles 56 of variable vanes 44 (shown in FIG. 1). Actuator 52 is a mechanical actuator for actuating variable vanes 42 and 44 via mechanical linkage 50. Actuator 52 is mounted to support structure 58, which is mounted to case 60 of gas turbine engine 10 (shown in FIG. 1). Support structure 58 includes side supports 62 and 64 connected to case 60, and includes cross support 66 connected between side supports 62 and 64. Actuator 52 is connected to cross support 66 via bracket 68.

Mechanical linkage 50 includes bellcrank 70, bellcrank arms 72, 74, and 76, link arms 78 and 80, rings 82 and 84, and variable vane arms 86 and 88. Bellcrank 70 has end 90 connected to side support 62 and end 92 connected to side support 64 so as to rotate about bellcrank axis 94. Bellcrank arm 76 connects actuator 52 to bellcrank 70. Bellcrank arm 72 connects bellcrank 70 to link arm 78, which is connected to ring 82, which is connected to variable vane arms 86, which are connected to spindles 54 of variable vanes 42. When actuator 52 rotates bellcrank 70, bellcrank arm 72 pushes or pulls link arm 78, which forces ring 82 to move circumferentially about case 60. Ring 82 is a synchronization ring connected to a plurality of spindles 54 of variable vanes 42 via a plurality variable vane arms 86. Thus when link arm 78 moves ring 82, variable vane arms 86 can simultaneously rotate each of variable vanes 42.

Similarly, bellcrank arm 74 connects bellcrank 70 to link arm 80, which is connected to ring 84, which is connected to variable vane arms 88, which are connected to spindles 56 of variable vanes 44. When actuator 52 rotates bellcrank 70, bellcrank arm 74 pushes or pulls link arm 80, which forces ring 84 to move circumferentially about case 60. Ring 84 is a synchronization ring connected to a plurality of spindles 56 of variable vanes 44 via a plurality variable vane arms 88. Thus when link arm 80 moves ring 84, variable vane arms 88 can simultaneously rotate each of variable vanes 44. In the illustrated embodiment, mechanical linkage 50 includes two rings 82 and 84 for rotating two stages of variable vanes 42 and 44. In an alternative embodiment, mechanical linkage 50 can have fewer or more than two rings for rotating fewer or more than two stages of variable vanes.

Figure 3:
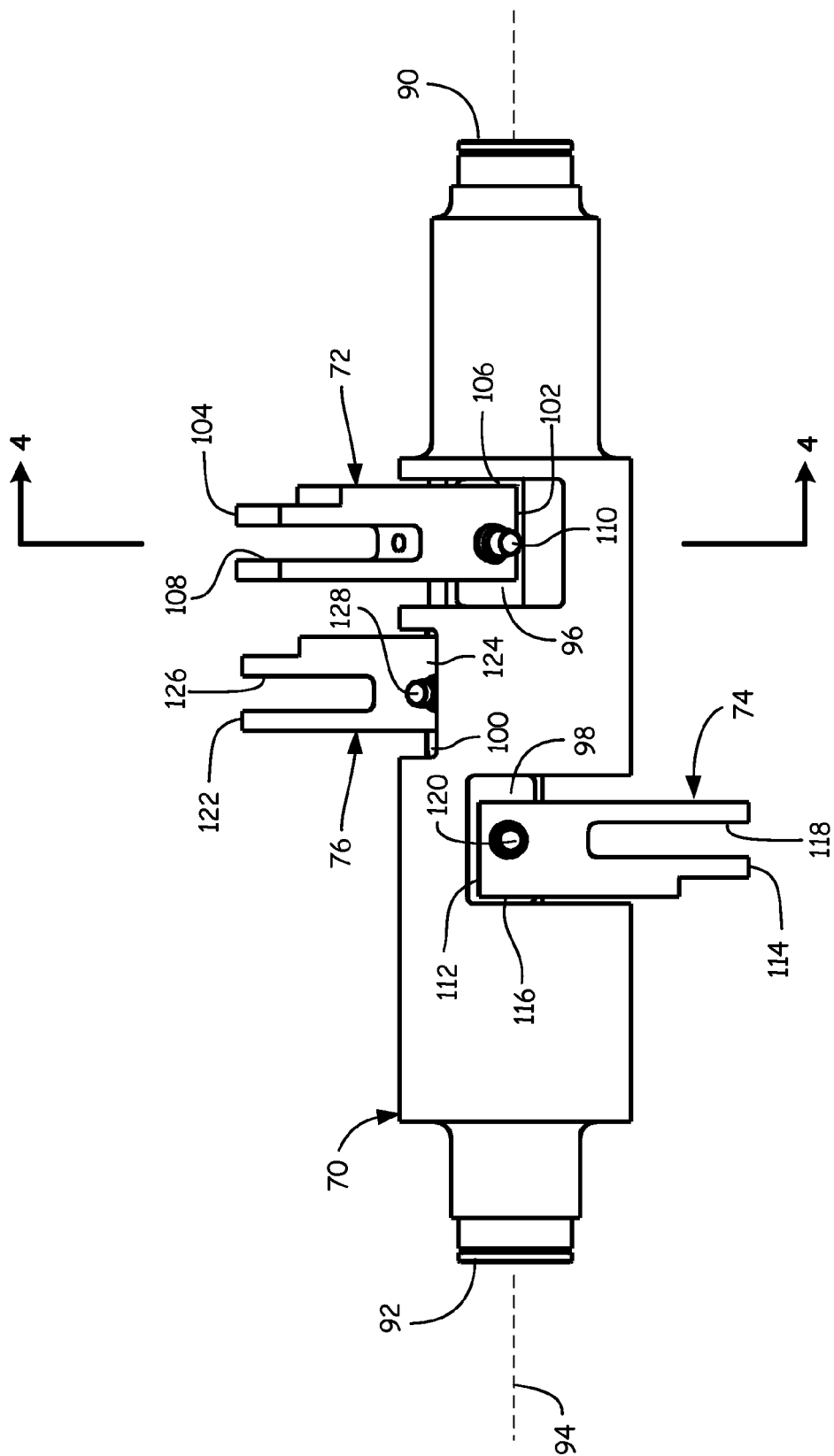
FIG. 3 is a side view of a bellcrank of the variable vane assembly of FIG. 2.

FIG. 3 is a side view of bellcrank 70 and bellcrank arms 72, 74, and 76. In the illustrated embodiment, bellcrank 70 includes three flanges 96, 98, and 100 for connecting to bellcrank arms 72, 74, and 76, respectively. Flanges 96, 98, and 100 extend substantially radially with respect to bellcrank axis 94. Flanges 96, 98, and 100 are spaced axially along bellcrank axis 94 and are spaced circumferentially at different angles about bellcrank axis 94. Bellcrank arms 72, 74, and 76 also extend substantially radially with respect to bellcrank axis 94. Bellcrank arms 72, 74, and 76 are also spaced axially along bellcrank axis 94 and are spaced circumferentially at different angles about bellcrank axis 94. In alternative embodiments, flanges 96, 98, and 100 and bellcrank arms 72, 74, and 76 can be positioned and spaced differently than as illustrated.

Bellcrank arm 72 has inner end 102 and outer end 104. Inner end 102 is inward of outer end 104 with respect to bellcrank axis 94. Bellcrank arm 72 has clevis 106 (better illustrated with respect to FIG. 4) at inner end 102 and clevis 108 at outer end 104. Clevis 106 is oriented 90 degrees from clevis 108. Clevis 106 connects to flange 96, for connecting bellcrank arm 72 to bellcrank 70. Pin 110 (which may be, for example, a bolt) extends through clevis 106 and flange 96 to attach bellcrank arm 72 to bellcrank 70. Clevis 108 connects outer end 104 of bellcrank arm 72 to one end of link arm 78 (shown in FIG. 2).

Bellcrank arm 74 is similar to bellcrank arm 72. Bellcrank arm 74 has inner end 112 and outer end 114. Inner end 112 is inward of outer end 114 with respect to bellcrank axis 94. Bellcrank arm 74 has clevis 116 at inner end 112 and clevis 118 at outer end 114. Clevis 116 connects to flange 98, for connecting bellcrank arm 74 to bellcrank 70. Pin 120 (which may be, for example, a bolt) extends through clevis 116 and flange 98 to fasten bellcrank arm 74 to bellcrank 70. Clevis 118 connects outer end 114 of bellcrank arm 74 to one end of link arm 80 (shown in FIG. 2).

Bellcrank arm 76 is similar to bellcrank arms 72 and 74. Bellcrank arm 76 has an inner end (not shown) and has outer end 122. Bellcrank arm 76 has clevis 124 at its inner end and has clevis 126 at outer end 122. Clevis 124 connects to flange 100, for connecting bellcrank arm 76 to bellcrank 70. Pin 128 (which may be, for example, a bolt) extends through clevis 124 and flange 100 to fasten bellcrank arm 76 to bellcrank 70. Clevis 126 connects outer end 122 of bellcrank arm 77 to actuator 52 (shown in FIG. 2).

Figure 4:
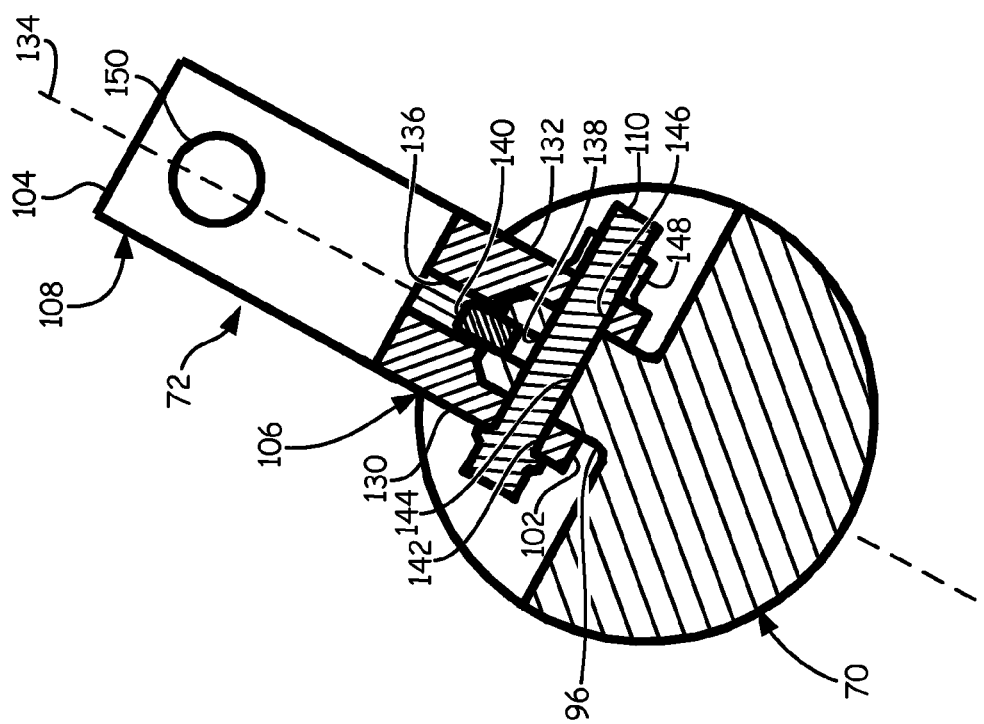
FIG. 4 is a partial sectional view of the bellcrank taken along line 4-4 of FIG. 3.

FIG. 4 is a partial sectional view of bellcrank 70 and bellcrank arm 72 taken along line 4-4 of FIG. 3. FIG. 4 illustrates clevis 106 of bellcrank arm 72 as having first and second ears 130 and 132. First ear 130 is substantially parallel to second ear 132. Flange 96 is positioned in a gap between first and second ears 130 and 132. Clevis 106 is aligned perpendicular to or rotated 90 degrees from clevis 108 along axis 134 of bellcrank arm 72.

Dowel hole 136 extends through bellcrank arm 72 along axis 134. Dowel hole 138 extends through flange 96 of bellcrank 70 and is aligned with dowel hole 136. Dowel pin 140 is positioned partially in each of dowel holes 136 and 138 and can be held in place via an interference fit.

Pin 110 extends through bolt hole 142 in first ear 130, through bolt hole 144 in flange 96, and through bolt hole 146 in second ear 132. In the illustrated embodiment, pin 110 is a threaded bolt connected to nut 148. Nut 148 is threaded on pin 110 and tightened against second ear 132. In alternative embodiments, pin 110 can be another type of threaded or non-threaded connector suitable for the application. Pin 110 and bolt holes 142, 144, and 146 are substantially parallel to bellcrank axis 94 (shown in FIGS. 2 and 3), and are angled substantially perpendicular to dowel pin 140, dowel holes 136 and 138, and axis 134.

During assembly, flange 96 is positioned in clevis 106 such that bolt holes 142, 144, and 146 are substantially aligned. Pin 110 is inserted through bolt hole 142, then through bolt hole 144, and then through bolt hole 146. Nut 148 is then threaded on an end of pin 110 and tightened against second ear 132. In one embodiment, flange 96 can fit tightly between first and second ears 130 and 132. In another embodiment flange 96 can fit loosely between first and second ears 130 and 132 when first positioned in clevis 106, and then clevis 106 can be tightened on flange 96 via tightening pin 110 and nut 148. First and second ears 130 and 132 can then be in contact with sides of flange 96 after tightening. In one embodiment, the space between first and second ears 130 and 132 can be only slightly larger than the width of flange 96, such as about 0.5 thou (about 0.0127 millimeters).

When flange 96 is positioned in clevis 106, dowel hole 136 can be aligned with dowel hole 138. Dowel pin 140 can then be inserted through dowel hole 136 into dowel hole 138 along axis 134 until dowel pin 140 is partially in each of dowel holes 136 and 138. After dowel pin 140 is inserted into dowel holes 136 and 138, clevis 108 can be connected to link arm 78 (shown in FIG. 2) via a pin (not shown) extending through hole 150 in clevis 108.

Figure 5:
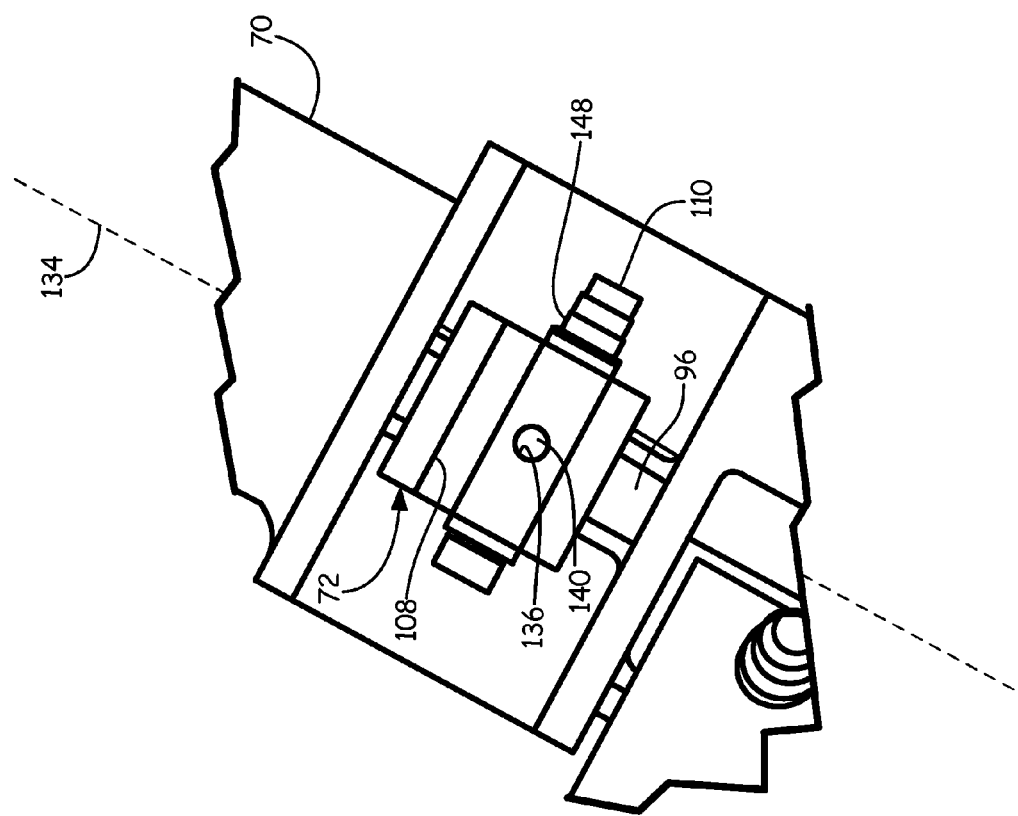
FIG. 5 is a partial top view of the bellcrank of FIG. 3.

FIG. 5 is a partial top view of bellcrank 70 and bellcrank arm 72. FIG. 5 shows bellcrank arm 72 from a view looking down clevis 108 into dowel hole 136. FIG. 5 also shows that pin 110 is perpendicular to both dowel hole 136 and bellcrank axis 134.

The connection between bellcrank 70 and bellcrank arm 72 (including clevis 106, flange 96, pin 110, and dowel pin 140) provides structural strength and orientation for bellcrank arm 72 during operation of mechanical linkage 50 in variable vane assembly 40. Load is transmitted between bellcrank 70 and bellcrank arm 72 through the connection between clevis 130 and flange 96, which act like a wrench and a nut. Load is also transmitted between bellcrank 70 and bellcrank arm 72 through pin 110 in a double-shear relationship. This relationship can create a relatively strong connection between bellcrank 70 and bellcrank arm 72 that allows mechanical linkage 50 to withstand relatively strong forces exerted upon and through mechanical linkage 50.

Pin 110 prevents or limits bellcrank arm 72 from pivoting with respect to bellcrank 70 in a circumferential direction with respect to bellcrank axis 94. Dowel pin 140 prevents or limits bellcrank arm 72 from pivoting with respect to bellcrank 70 about pin 110. Pin 110 can be a tight tolerance bolt, and dowel pin 140 can be a tight tolerance dowel pin. The combination of pin 110 and dowel pin 140 can orient bellcrank arm 72 relatively precisely with respect to bellcrank 70. This can allow mechanical linkage 50 to control position of variable vanes 42 and 44 relatively precisely, thus improving performance and efficiency of gas turbine engine 10.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims. For example, mechanical linkage 50 and/or other parts of variable vane assembly 40 can be configured differently than as illustrated as appropriate for the application.

Discussion of Possible Embodiments

The following are non-exclusive descriptions of possible embodiments of the present invention.

A gas turbine engine can include a flow path and a variable vane assembly. The variable vane assembly can include a variable vane positioned in the flow path and rotatable about an axis of the variable vane, an actuator, and a mechanical linkage connecting the variable vane to the actuator. The mechanical linkage includes a bellcrank rotatable about an axis, a first bellcrank arm having a first clevis at an inner end, and a first pin extending through the first clevis and a first flange of the bellcrank to fasten the first bellcrank arm to the bellcrank.

The gas turbine engine of the preceding paragraph can optionally include, additionally and/or alternatively any, one or more of the following features, configurations and/or additional components:

the gas turbine engine can be an industrial gas turbine engine that can include a low pressure compressor section including the variable vane assembly and a power turbine section positioned downstream of the low compressor section;

the first bellcrank arm can include a second clevis at an outer end, the second clevis can be oriented 90 degrees from the first clevis, and the actuator can be connected to the second clevis;

the mechanical linkage can include a second bellcrank arm having a third clevis and a fourth clevis, and a second pin extending through the third clevis and through a second flange on the bellcrank to fasten the second bellcrank arm to the bellcrank;

the mechanical linkage can include a variable vane arm connected to a spindle of the variable vane, a synchronization ring connected to the variable vane arm, and a link arm connecting the fourth clevis to the synchronization ring; the variable vane can rotate in response to the actuator rotating the bellcrank; and/or the variable vane can be one of a first stage of variable vanes, the first bellcrank arm can connect the bellcrank to the first stage of variable vanes, the mechanical linkage can include a second bellcrank arm and a third bellcrank arm, the second bellcrank arm can have a second clevis connected to a second flange of the bellcrank, the second bellcrank arm can connect the bellcrank to a second stage of variable vanes, the third bellcrank arm can have a third clevis connected to a third flange of the bellcrank, and the third bellcrank arm can connect the bellcrank to the actuator.

A variable vane assembly for use in a gas turbine engine can include a variable vane, an actuator, and a mechanical linkage connecting the variable vane to the actuator. The mechanical linkage can include a bellcrank rotatable about an axis, a first bellcrank arm having a first clevis at an inner end, and a first pin extending through the first clevis and a first flange of the bellcrank to fasten the first bellcrank arm to the bellcrank.

The variable vane assembly of the preceding paragraph can optionally include, additionally and/or alternatively any, one or more of the following features, configurations and/or additional components:

the pin can be angled with respect to the axis of the first bellcrank arm;

the first bellcrank arm can connect the bellcrank to the variable vane, the mechanical linkage can include a second bellcrank arm having a second clevis connected to a second flange of the bellcrank, and the second bellcrank arm can connect the bellcrank to the actuator;

the first clevis can include first and second ears, and the first flange can be positioned between the first and second ears;

the first bellcrank arm can include a first dowel hole, the bellcrank can include a second dowel hole, and a dowel pin can be positioned at least partially in each of the first and second dowel holes;

the first pin can be a bolt, and the first and second dowel holes can be substantially perpendicular to the bolt; and/or the first and second dowel holes can be substantially perpendicular to the axis of the bellcrank.

A method of assembling a variable vane assembly for use in a gas turbine engine can include positioning a flange of a bellcrank in a clevis of a bellcrank arm and inserting a pin through the flange and the clevis to connect the bellcrank arm to the bellcrank.

The method of the preceding paragraph can optionally include, additionally and/or alternatively any, one or more of the following features, configurations and/or additional steps:

aligning a first hole on the flange with second and third holes on first and second respective ears of the clevis prior to inserting the pin;

the pin can be a bolt, the flange can fit loosely between first and second ears of the clevis when first positioned in the clevis, and the method can further include threading a nut on the bolt and tightening the nut such that the first and second ears of the clevis are in contact with sides of the flange;

the pin can be a bolt and the method can further include inserting a dowel pin through a first dowel hole in the bellcrank arm and through a second dowel hole in the bellcrank;

the clevis can be a first clevis at an inner end of the bellcrank arm, and the method can further include connecting a second clevis at an outer end of the bellcrank arm to an actuator;

the clevis can be a first clevis at an inner end of the bellcrank arm, and the method can further include connecting a second clevis at an outer end of the bellcrank arm to a link arm; and/or connecting the link arm to a synchronization ring, connecting the synchronization ring to a plurality of variable vane arms, and connecting the plurality of variable vane arms to a plurality of variable vanes, wherein the plurality of variable vanes rotate in response to rotation of the bellcrank.

The invention claimed is:

1. A gas turbine engine comprising:
a flow path; and
a variable vane assembly comprising:
a variable vane positioned in the flow path and rotatable about an axis of the variable vane;
an actuator; and
a mechanical linkage connecting the variable vane to the actuator, the mechanical linkage comprising:
a bellcrank rotatable about an axis;
a first bellcrank arm having a first clevis at an inner end; and
a first pin extending through the first clevis and a first flange of the bellcrank to fasten the bellcrank arm to the bellcrank.

2. The gas turbine engine of claim 1, wherein the gas turbine engine is an industrial gas turbine engine comprising:

a low pressure compressor section including the variable vane assembly; and a power turbine section positioned downstream of the low compressor section.

3. The gas turbine engine of claim 1, wherein the first bellcrank arm includes a second clevis at an outer end, and wherein the second clevis is oriented 90 degrees from the first clevis, and wherein the actuator is connected to the second clevis.

4. The gas turbine engine of claim 3, wherein the mechanical linkage further comprises:

a second bellcrank arm having a third clevis and a fourth clevis; and a second pin extending through the third clevis and through a second flange on the bellcrank to fasten the second bellcrank arm to the bellcrank.

5. The gas turbine engine of claim 4, wherein the mechanical linkage further comprises:

a variable vane arm connected to a spindle of the variable vane;

a synchronization ring connected to the variable vane arm; and a link arm connecting the fourth clevis to the synchronization ring, wherein the variable vane rotates in response to the actuator rotating the bellcrank.

6. The gas turbine engine of claim 1, wherein the variable vane is one of a first stage of variable vanes, wherein the first bellcrank arm connects the bellcrank to the first stage of variable vanes, the mechanical linkage further comprising:

a second bellcrank arm having a second clevis connected to a second flange of the bellcrank, wherein the second bellcrank arm connects the bellcrank to a second stage of variable vanes; and a third bellcrank arm having a third clevis connected to a third flange of the bellcrank, wherein the third bellcrank arm connects the bellcrank to the actuator.

7. A variable vane assembly for use in a gas turbine engine, the variable vane assembly comprising:

a variable vane;

an actuator; and a mechanical linkage connecting the variable vane to the actuator, the mechanical linkage comprising:

a bellcrank rotatable about an axis;

a first bellcrank arm having a first clevis at an inner end; and a first pin extending through the first clevis and a first flange of the bellcrank to fasten the first bellcrank arm to the bellcrank.

8. The variable vane assembly of claim 7, wherein the first pin is angled with respect to an axis of the first bellcrank arm.

9. The variable vane assembly of claim 7, wherein the first bellcrank arm connects the bellcrank to the variable vane, the mechanical linkage further comprising:

a second bellcrank arm having a second clevis connected to a second flange of the bellcrank, wherein the second bellcrank arm connects the bellcrank to the actuator.

10. The variable vane assembly of claim 7, wherein the first clevis includes first and second ears and wherein the first flange is positioned between the first and second ears.

11. The variable vane assembly of claim 7, wherein the first bellcrank arm comprises a first dowel hole, wherein the bellcrank comprises a second dowel hole, and further comprising:

a dowel pin positioned at least partially in each of the first and second dowel holes.

12. The variable vane assembly of claim 11, wherein the first pin is a bolt, and wherein the first and second dowel holes are substantially perpendicular to the bolt.

13. The variable vane assembly of claim 11, wherein the first and second dowel holes are substantially perpendicular to the axis of the bellcrank.

14. A method of assembling a variable vane assembly for use in a gas turbine engine, the method comprising:

positioning a flange of a bellcrank in a clevis of a bellcrank arm; and inserting a pin through the flange and the clevis to connect the bellcrank arm to the bellcrank.

15. The method of claim 14, and further comprising:

aligning a first hole on the flange with second and third holes on first and second respective ears of the clevis prior to inserting the pin.

16. The method of claim 15, wherein the pin is a bolt, wherein the flange fits loosely between first and second ears of the clevis when first positioned in the clevis, and further comprising:

threading a nut on the bolt; and tightening the nut such that the first and second ears of the clevis are in contact with sides of the flange.

17. The method of claim 14, wherein the pin is a bolt, and further comprising:

inserting a dowel pin through a first dowel hole in the bellcrank arm and through a second dowel hole in the bellcrank.

18. The method of claim 14, wherein the clevis is a first clevis at an inner end of the bellcrank arm, and further comprising:

connecting a second clevis at an outer end of the bellcrank arm to an actuator.

19. The method of claim 14, wherein the clevis is a first clevis at an inner end of the bellcrank arm, and further comprising:

connecting a second clevis at an outer end of the bellcrank arm to a link arm.

20. The method of claim 19, and further comprising:

connecting the link arm to a synchronization ring;

connecting the synchronization ring to a plurality of variable vane arms; and connecting the plurality of variable vane arms to a plurality of variable vanes, wherein the plurality of variable vanes rotate in response to rotation of the bellcrank.

\* \* \* \* \*